INVENTOR.
HARVEY W. BALZER
BY Wm. Walter Owen
ATTORNEY

Nov. 7, 1950 H. W. BALZER 2,529,364

SYSTEM FOR CONTROLLING AUTOMATIC SIGNALING FOR TELEPHONE LINES

Filed July 22, 1947 5 Sheets-Sheet 2

INVENTOR.
HARVEY W. BALZER

BY *[signature]*

ATTORNEY

Nov. 7, 1950 H. W. BALZER 2,529,364

SYSTEM FOR CONTROLLING AUTOMATIC SIGNALING FOR TELEPHONE LINES

Filed July 22, 1947 5 Sheets-Sheet 3

INVENTOR.
HARVEY W. BALZER

BY

ATTORNEY

Nov. 7, 1950 H. W. BALZER 2,529,364

SYSTEM FOR CONTROLLING AUTOMATIC SIGNALING FOR TELEPHONE LINES

Filed July 22, 1947 5 Sheets-Sheet 4

*INVENTOR.*
HARVEY W. BALZER

BY [signature]

ATTORNEY

Nov. 7, 1950 H. W. BALZER 2,529,364

SYSTEM FOR CONTROLLING AUTOMATIC SIGNALING FOR TELEPHONE LINES

Filed July 22, 1947 5 Sheets-Sheet 5

INVENTOR.
HARVEY W. BALZER

BY Wm. Walter Owen

ATTORNEY

Patented Nov. 7, 1950

2,529,364

UNITED STATES PATENT OFFICE 2,529,364

SYSTEM FOR CONTROLLING AUTOMATIC SIGNALING FOR TELEPHONE LINES

Harvey W. Balzer, Downers Grove, Ill., assignor to Automatic Electric Laboratories, Inc., Chicago, Ill., a corporation of Delaware Application July 22, 1947, Serial No. 762,595

9 Claims. (Cl. 179—27)

The present invention relates to telephone systems in general and, more particularly, to improved circuits and apparatus for controlling the operation of line signals in an automatic telephone system.

In the usual automatic telephone system calls between local lines and distant points are completed thru an operator attended manual switchboard. The switchboard may comprise a number of operator positions each of which has access to switches thru which calls from distant points may be extended to the local lines. The switchboard and the switches are usually arranged for one of two services, either automatic ringing or delayed ringing. In the first instance signalling will be automatically started shortly after a connection has been extended to a called line. In the second instance signalling will not be started after a connection has been extended to a called line until the operator performs a ring-start operation to make the automatic ringing equipment effective. In some cases the switchboard and the switches are arranged so that an operator may extend calls in two different manners, one of which provides automatic ringing and the other of which provides delayed ringing. In this invention the switchboard and the switches are arranged so that either automatic ringing or delayed ringing may be employed and so that individual switchboard positions may be quickly conditioned to provide whichever of the two services that is desired. The operators extend all calls in the same manner with the exception that, when delayed ringing is employed, a ring-start operation is performed at the time it is desired to start automatic ringing.

It is an object of the present invention to provide improved means for permitting either automatic ringing or delayed ringing in an automatic telephone system.

It is another object of the present invention to provide, at a switchboard position, apparatus which can be readily operated to condition the switchboard position for either automatic ringing or delayed ringing.

A feature of the present invention relates to the use of a non-talking conductor to effect ringing control when automatic ringing is used and to the use of a talking conductor to effect ringing control when delayed ringing is used.

Another feature of the present invention relates to the use of a calling device to provide for ringing control over the same conductor over which dialing control is accomplished.

Other features of the invention not specifically mentioned will be apparent from the following description.

Referring now to the drawings comprising Figures 1 to 6, inclusive;

Figure 1:
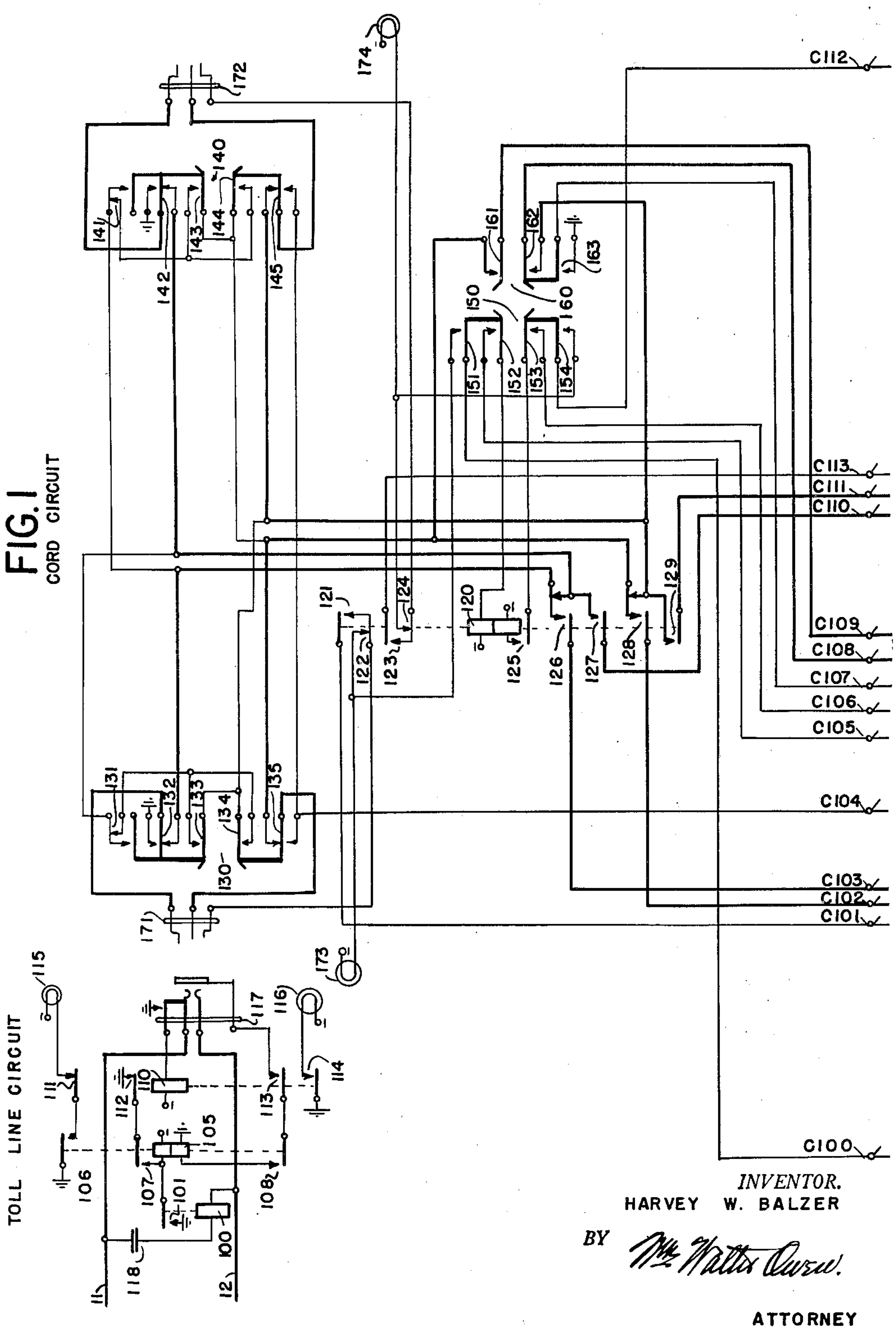
Fig. 1 shows a toll line circuit to a distant exchange and a cord circuit at a manual switchboard.
Figure 2:
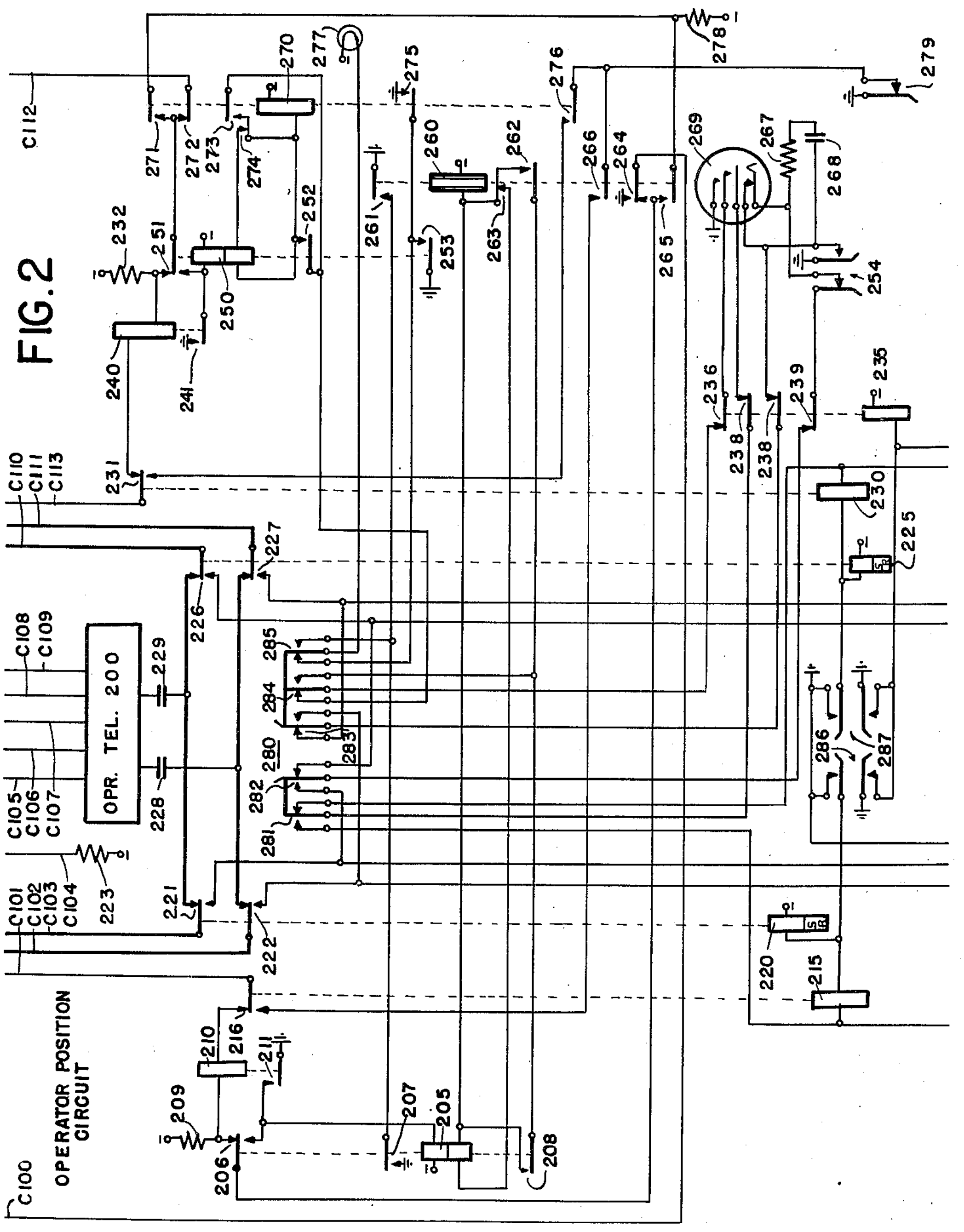
Fig. 2 shows circuits for an operator's telephone and operator's common equipment, primarily for dialing, splitting and ringing control for use with the cord circuit in Fig. 1.

The toll line circuit shown in Fig. 1 is the conventional jack ended type and may be one of a number of such lines extending to a distant city. The cord circuit shown in Fig. 1 is the universal type and is one of a number of cord circuits at an operator's position. The cord circuits, of which the cord circuit in Fig. 1 is typical, may be individually connected to the operator's telephone and common equipment in Figs. 2 and 3 over the common conductors C100 to C113, inclusive. The plug 171, the ringing key 130 and the signal lamp 173 are associated with one end of the cord circuit while the plug 172, the ringing key 140, and the signal lamp 174 are associated with the other end of the cord circuit. One of the talking conductors of the cord circuit extends from the upper conductor of the plug 171 thru normally closed contacts of the relay 120 to the upper conductor of the plug 172. The other talking conductor of the cord circuit extends from the center conductor of the plug 171 thru normally closed contacts of the relay 120 to the center conductor of the plug 172. The operation of the talk key 150, and the operation of the relay 120 under joint control of the talk key 150 and operator's telephone 200 over the conductors C105 and C106 associates the cord circuit in Fig. 1 with the operator's telephone 200 and the operator's common equipment in Figs. 2 and 3. The monitor key 160 also serves to associate the cord circuit in Fig. 1 with the operator's telephone 200 over the conductors C107, C108 and C109, the conductor C107 being a control conductor to arrange the operator's telephone 200 particularly for monitoring.

Figure 4:
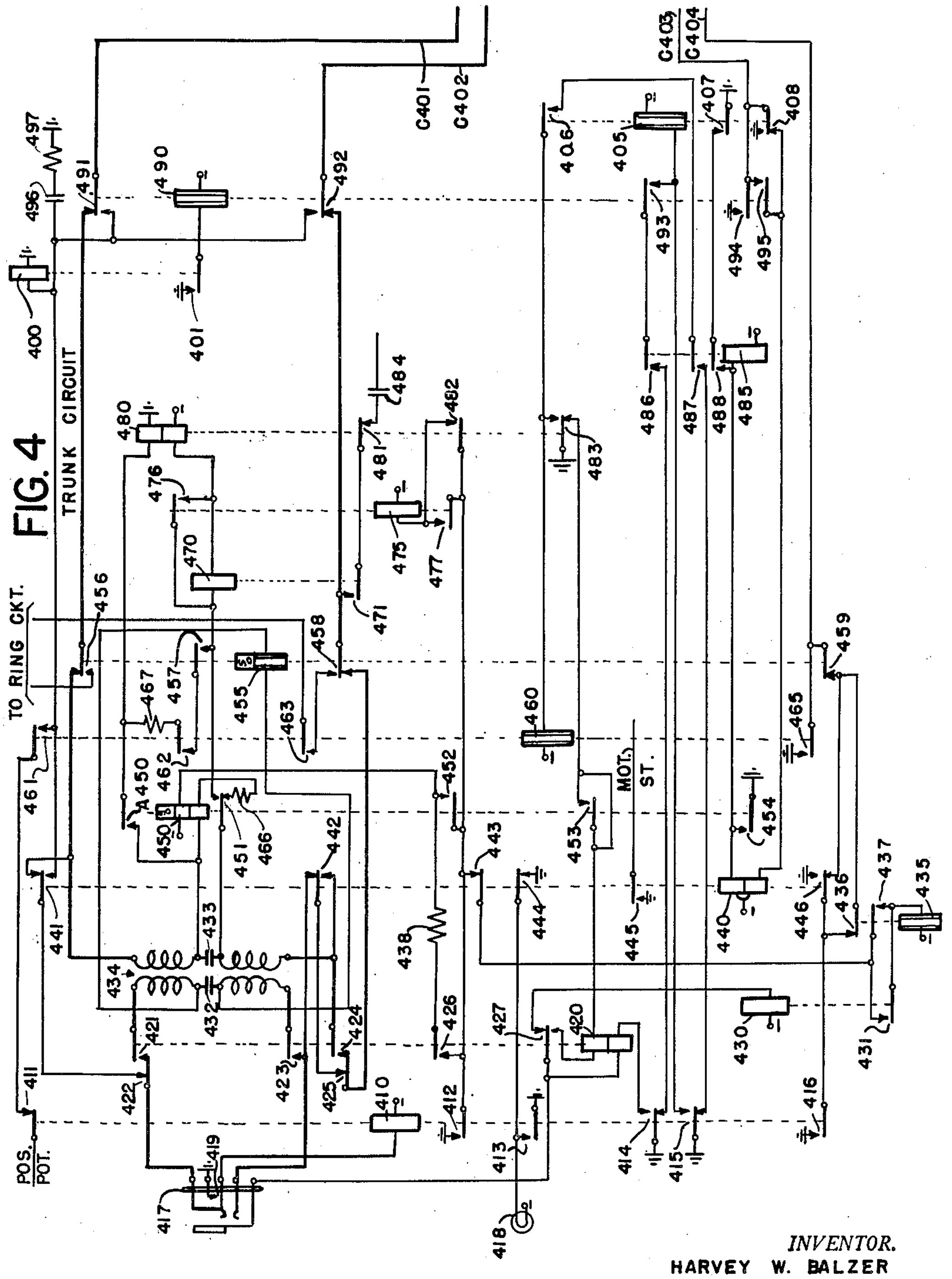
Fig. 4 shows a trunk circuit for establishing connections from the manual switchboard to the local lines.

The operator's telephone 200 is equipped with the usual talking instrumentalities which, with the talk key 150 and the relay 120 operated, are connected to the talking conductors of the cord circuit in Fig. 1 thru the condensers 228 and 229 over the conductors C102, C103, C110 and C111. The operation of the relay 220 under control of the key 286 disconnects the talking conductors associated with the plug 171 from the operator's telephone 200, while the operation of the relay 225 under control of the key 287 disconnects the talking conductors associated with the plug 172 from the operator's telephone 200. The relay 235 which operates under control of either the key 286 or the key 287 prevents the connection of the dial 269 to the end of the cord circuit disconnected from the operator's telephone 200. When the dial 269 is moved off normal its three upper contacts are closed, and if the key 280 is normal, the relays 225, 230 and 270 are operated. The relay 225 connects the upper and center conductors of the plug 172 to the impulsing contacts, i. e., the two lower contacts of the dial 269. The relay 230 disconnects the lower conductor of the plug 172 from negative battery to transfer the control of the bridge in an associated trunk circuit, such as the trunk circuit in Fig. 4, to the impulsing contacts of the dial 269. The relay 270 extends the lower conductor of the plug 172 to contacts of the key 279. If the key 279 is normal, ground is extended to an associated trunk circuit, such as the trunk circuit in Fig. 4, to start automatic ringing when a connection is extended to a local line. If the key 279 is operated ground is not extended to an associated trunk circuit, and the operator starts the automatic ringing by means of the ringing key 140. The ringing control features embodied in the cord circuit Fig. 1, the operator's common equipment Fig. 2, and the trunk circuit Fig. 4 are the principal feature of this invention and will be fully described hereinafter. If the key 280 is operated and the dial 269 moved off normal the relays 215, 220 and 260 are operated to effect similar controls over the end of the cord circuit connected to the plug 171.

Figures 3, 6:
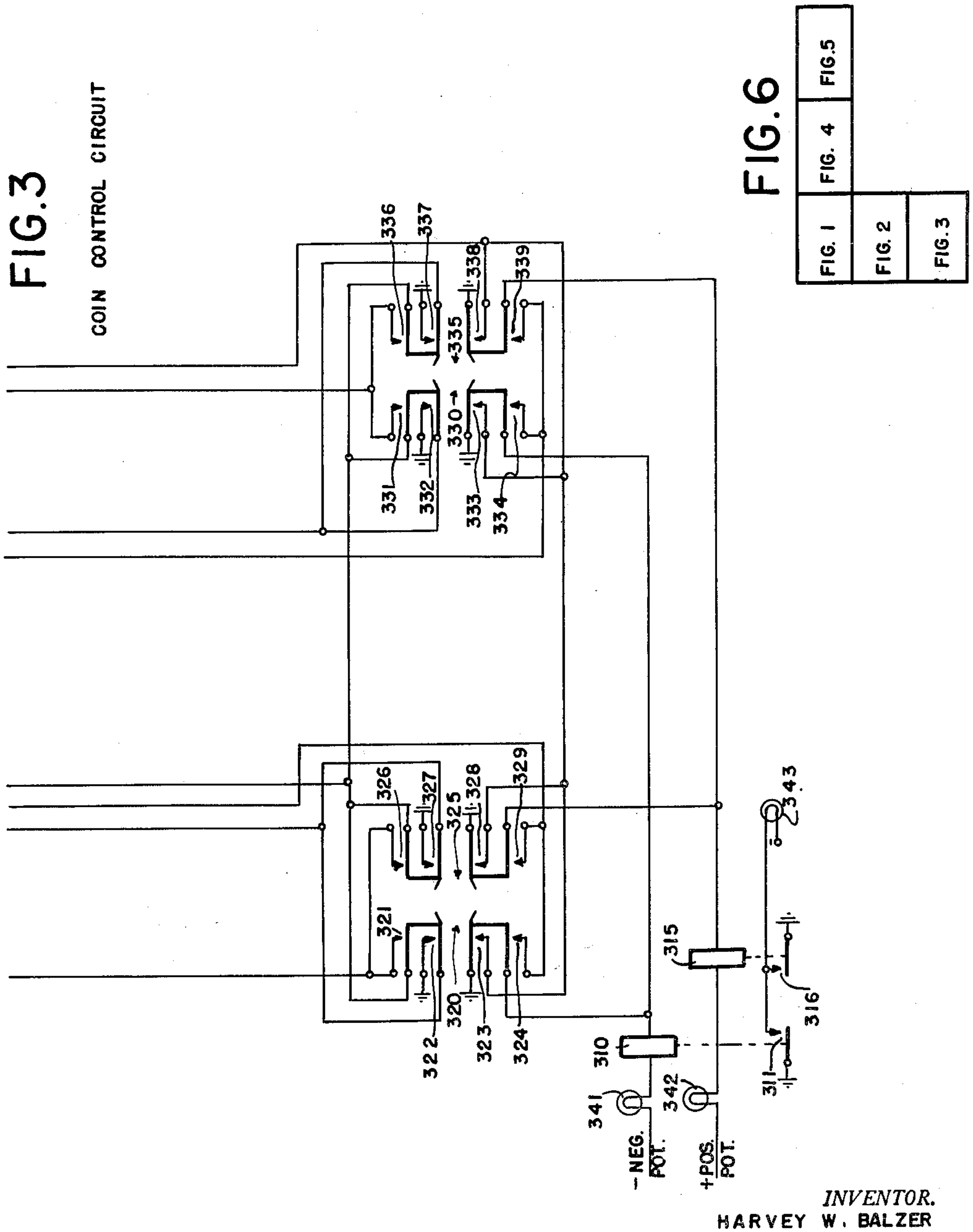
Fig. 3 shows a circuit for operator's common equipment for controlling the coin control mechanisms of paystations.
Fig. 6 is a drawing layout showing how Figs. 1 to 5, inclusive, are to be assembled.

The common equipment shown in Fig. 3 provides manual coin control. The operation of the key 320 operates the relays 215 and 220, grounded negative potential Neg. Pot. being connected to the upper conductor of the plug 171, ground being connected to the center conductor of the plug 171, and the lower conductor of the plug 171 being disconnected from battery. The operation of the key 325 also causes the operation of the relays 215 and 220 but in this case grounded positive potential Pos. Pot. is connected to the upper conductor of the plug 171. The operation of the keys 330 and 335, in co-operation with the relays 225 and 230 exercises similar controls over the end of the cord connected to the plug 172.

The trunk circuit shown in Fig. 4 is somewhat similar to the trunk circuit shown in Patent 1,956,374, issued April 24, 1934, to T. F. Crocker. This circuit is used for extending connections from the cord circuit shown in Fig. 1 thru the switch train shown in Fig. 5 to the local lines, the plug 172 being inserted in the jack 417 to seize the trunk circuit shown in Fig. 4. The relay 420 is operated upon the insertion of the plug 172 into the jack 417 and is released when the dial 269 is moved off normal to extend the conductors C401 and C402 to the impulsing contacts of the dial 269. The relay 430 is operated when the dial 269 is moved off normal providing the key 279 is in its normal position. The relay 435 operates, in case the relay 430 operates, and removes ground from the conductor C404 to cause automatic ringing to start immediately after a connection is extended to a local line thru a connector such as the connector shown in Fig. 5, as will be fully described hereinafter.

Figure 5:
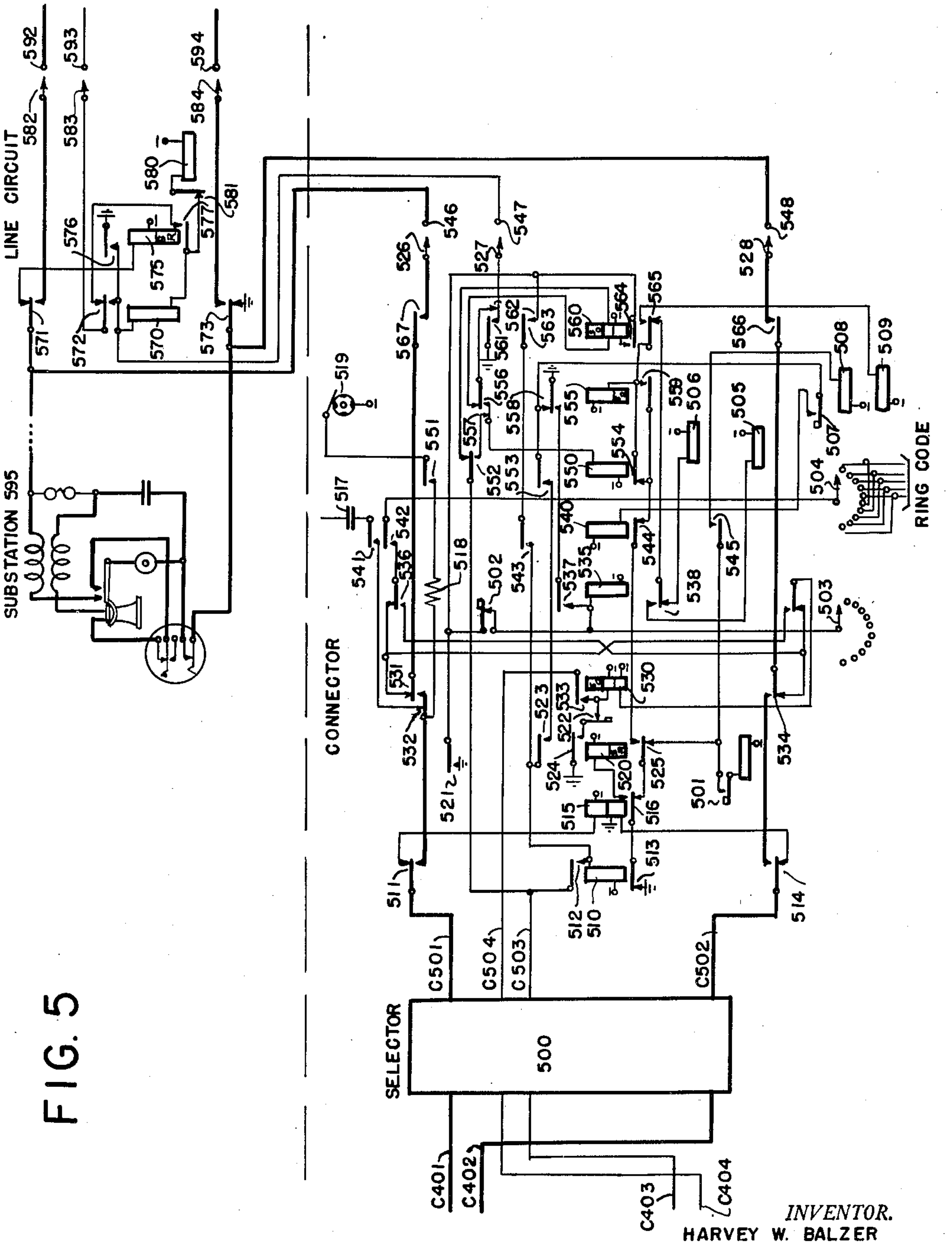
Fig. 5 shows a circuit for local line having a substation and a rotary lineswitch associated therewith, and circuits for a selector and a connector associated with the trunk circuit in Fig. 4.

The selector 500 and the connector shown in Fig. 5 are the well known two-motion type and are identical to the selector and connector shown in Crocker 1,956,374, issued April 24, 1934, the specification of which may be seen for a detailed description of both. The conductors C401 and C402 are normally connected to the negative winding and the positive winding respectively of the line relay, not shown, of the selector 500. When the selector 500 switches thru to a connector the line relay of the selector is disconnected and the conductors C401, C402, C403 and C404 are extended to conductors such as the conductors C501, C502, C503 and C504 respectively thru the wipers of the selector and bank contacts which are not shown. The substation shown in Fig. 5 is the well known common battery type equipped with the usual talking and signalling instrumentalities required for making and receiving calls in an automatic telephone system. The line circuit shown in Fig. 5 is identical to the line circuit shown in Patent 2,113,080, issued April 5, 1938, to T. F. Crocker et al. the specification of which may be seen for a detailed description thereof.

Having described the invention in general, a detailed description of a call thru the cord circuit in Fig. 1 to the local line in Fig. 5 will now be given. Assume that the plug 171 has been inserted in the jack 117, that the key 150 and the relay 120 are operated, and that a connection is to be extended from the toll line circuit in Fig. 1 to the substation 595 in Fig. 5. The call is extended by way of an outgoing trunk circuit such as the trunk circuit shown in Fig. 4. In this case the trunk circuit shown in Fig. 4 is used and the plug 172 is inserted in the jack 417, establishing connection between the upper, center and lower conductors of the plug 172 and the upper, center and lower conductors, respectively, of the jack 417 and operating the contacts 419. Ground at contacts 419 closes a circuit thru the winding of the relay 410 to battery thus operating the relay 410 which at armature 411 disconnects Pos. Pot. from armature 461, connects ground to the armature 412 for control purposes which will be described subsequently, at armature 413 energizes the lamp 418 to indicate the busy condition of the trunk circuit, at armature 414 connects ground thru the lower winding of the relay 420 to the lower conductor of the jack 417, at armature 415 closes a circuit from ground thru the winding of the relay 405 to battery, and at armature 416 connects ground thru armatures 436 and 446 in multiple and armature 459 to the conductor C404. The lower winding of the relay 420 is energized from ground thru armature 414, lower conductors of jack 417 and plug 172, and as the talk key 150 and the relay 120 are operated, thru armature 123, conductor C113, winding of the relay 240 and resistor 232 to battery. The relay 420 operates and at contact 422 disconnects the upper conductor of the jack 417 from conductor C401, at armatures 421 and 423 connects the upper and center conductors of the jack 417, respectively, to the upper and lower terminals of the left winding of the repeating coil 434, at contact 425 disconnects the center conductor of the jack 417 from the conductor C402, at armature 424 closes a circuit to the lower winding of the relay 450 in series with the line relay of the selector 500 which may be traced over conductor C401, armatures 491 and 456, right winding of repeating coil 434, lower winding of relay 450, resistor 466, armature 457, right winding of repeating coil 434, armatures 424, 458 and 492 and conductor C402, closes a circuit from ground thru armatures 412 and 426, resistor 438 and the upper winding of the relay 450 to battery, and at armature 427 closes at multiple circuit to the relay 240 thru the upper winding of the relay 420, to ground at armature 483. The windings of the relay 450 are energized in opposition at this time and the relay does not operate. The relay 405 energized as previously described operates and at armature 406 prepares a circuit for the relay 460, at armature 407 prepares a circuit for the relay 485 and at armature 408 disconnects the lower winding of the relay 440 from conductor C403 and connects ground over conductor C403 to the selector 500.

The relay 240 operates when energized from ground thru the upper winding of the relay 420 over a circuit previously traced and at armature 241 energizes the upper winding of the relay 250. The relay 250 operates and lights the dial pilot lamp 277 from ground thru armature 253 and spring 285, prepares a circuit for the relay 270 at armature 252, and lights the supervisory lamp 174 from ground thru armatures 241, 251 and 272, conductor C112 and spring 154. The operator now dials the digits required to extend the call by way of selector 500 and the connector, Fig. 5, to the substation 595. When the dial 269 is moved off normal the relays 225 and 230 are operated from battery thru the windings of the relays 225 and 230, spring 281, armature 233, and the upper contacts of the dial 269 to ground, and the relay 270 is operated from battery thru its winding, armature 252, spring 284, armature 236 and the upper contacts of the dial 269 to ground. The relay 270 on operating prepares a multiple battery connection to the relay 240 at armature 271, closes a circuit to the lamp 174 over the conductor C112 at armature 272, closes a holding circuit to its own winding at armature 273, closes a circuit to the lamp 277 at armature 275 and prepares a circuit to the relay 430 as will be described hereinafter. The relay 230 on operating opens the circuit to the relays 240 and 420 at armature 231 and extends the conductor C113 thru armature 276 to the key 279. The relay 240 releases and allows the relay 250 to release. The relay 420 also releases and the relay 225 operates. A circuit may now be traced to the line relay of the selector 500 over conductor C401, armatures 491, 456 and 411, contact 422, upper conductors of jack 417 and plug 172, spring 142, armature 127, conductor C110, armature 226, spring 282, armature 239, key 254, lower contacts of the dial 269, armature 238, spring 283, armature 227, conductor C111, armature 129, spring 145, center conductors of plug 172 and jack 417, armature 442, contacts 425, armatures 458 and 492, and conductor C402. The relay 420 on restoring connects battery thru the winding of the relay 430, armature 427, lower conductors of jack 417 and plug 172, armature 123, conductor C113, and armatures 231 and 276 to ground thru normally closed contacts of the key 279. The relay 430 operates and closes a circuit from battery thru the winding of the relay 435 and armatures 431, 443 and 412 to ground thus operating the relay 435. The relay 435 closes its holding circuit at armature 437 and at armature 436 opens a circuit for ground from armature 416 to conductor C404. If the key 279 is operated before the dial is moved off normal and is not restored until after dialing is completed the relay 430 will not be operated as ground will not be connected at the contacts of the key 279. The relay 435 remains at normal and ground thru armatures 416 and 436 remains connected to the conductor C404. The normal or operated position of the key 279 determines whether ringing will be started immediately after a connection has been extended to a line or whether ringing will be started at some later time under control of the operator as will be fully described hereinafter. The line relay of the selector 500 responds to the impulses of the first digit and steps the wipers of the selector to the corresponding level which in this case would be the level associated with the connector shown in Fig. 5. Assume now that the connector shown in Fig. 5 is the first connector available and that the connection to the substation 595 is extended thru it.

When the dial restores to normal the circuits to the relays 225, 230 and 270 are opened. The relay 230 restores and closes a circuit to the lower winding of the relay 420 in series with the relay 240. The relay 420 operates and closes a circuit to its upper winding in series with the relay 240 which operates and energizes the upper winding of the relay 250. The relay 270 restores, opens the incomplete circuit to the relay 430 at armature 276 and transfers the circuit for the lamp 174 to the relay 250. The relay 250 operates, prepares the starting circuit to the relay 270 at armature 252, and closes a circuit to the lamp 174 at armature 251. Shortly thereafter the relay 225 which is slow to release, restores and the relay 515 is operated in series with the lower winding of the relay 450 from battery thru the upper winding of the relay 515, armature 511, conductors C501 and C401, armatures 491 and 456, right winding of repeating coil 434, lower winding of the relay 450, resistor 466, armature 451, right winding of repeating coil 434, armatures 424, 458 and 492, conductors C402 and C502, armature 514 and the lower winding of the relay 515 to ground. The relay 515 operates and at armature 516 closes a circuit to the relay 520. The relay 520 operates, connects ground thru armature 521 and off normal contact 502 to the winding of the relay 535 causing the relay 535 to operate, closes a circuit to the upper winding of the relay 530 from ground thru armature 524 and off normal contacts 522 and prepares the impulsing circuit at armature 525. The relay 535 prepares a holding circuit for itself at armature 537 and prepares a circuit to the vertical magnet 505 at armature 538. The relay 530 operates and closes a holding circuit for itself thru armature 533 to ground on the conductor C504.

When the dial 269 is again moved off normal to transmit the next digit in the number of the substation 595 the relays 225, 230 and 270 operate and the relay 420 restores as previously described thus placing the relay 515 under control of the impulsing contacts of the dial 269. The relay 515 follows the impulses from the dial 269 and at armature 516 closes and opens a circuit to the vertical magnet 505 and the relay 555 in multiple. This circuit may be traced from ground thru armatures 513, 516, 525, 544 and 554 thru the winding of the relay 555 to battery and thru armatures 565 and 538 thru the winding of the vertical magnet 505 to battery. The relay 555 operates on the first closure of this circuit and is equipped with a slow release device which causes it to remain operated while the impulses of a digit are being transmitted. Ground thru armatures 558 and 537 provide a holding circuit for the relay 535. The vertical magnet operates and moves the wipers 526, 527 and 528 to the level corresponding to the dialed digit. Off normal contacts 502 and 522 open when the wipers are first moved off normal thus opening the starting circuits to the relays 535 and 530. The circuit to the relay 520 is interrupted during impulsing but the relay is slow to release and does not restore. After the dial restores to normal the relay 515 remains operated until another digit is dialed. The circuit to the relay 555 is opened at armature 516 allowing the relay 555 to restore and open the holding circuit to the relay 535 which restores and prepares a circuit to the rotary magnet 506. Relay 515 responds to the next digit dialed and at armature 516 closes and opens a circuit to the relay 555 and the rotary magnet 506 in multiple. The rotary magnet moves the wipers 526, 527 and 528 to the bank contacts corresponding to the dialed digit which in this case are the bank contacts 546, 547 and 548 of the local line circuit of the substation 595, shortly after the dial restores to normal the relay 555 restores and assuming that the dialed line is not busy a circuit is now closed from battery thru the winding of the magnet 580, armature 581, winding of cut-off relay 570, contact 547, wiper 527, contact 562, armature 556, upper winding of the relay 560, armature 552, conductors C503 and C403 to ground at armature 408. The relay 560 operates its armature 564, closing a circuit from battery thru the lower winding of the relay 560 to ground thru armatures 564 and 521. The cut-off relay 570 operates and disconnects ground from one side of the local line at armature 573 and disconnects the line relay 575 from the other side of the local line at armature 571. The relay 561 operates in full when its lower winding is energized and at armature 561 closes a holding circuit to the cut-off relay 570, at armature 565 prepares a circuit to the operating magnet 509 of the minor switch and at armatures 566 and 567 closes a part of a circuit from the wipers 526 and 528 to the conductors C501 and C502. The relay 515 responds to the impulses of the next digit and closes and opens a circuit to the relay 555 in multiple with the operating magnet 509. The relay 555 operates and remains operated until all of the impulses of the digit are received. The operating magnet 509 operates the wipers 503 and 504 to the contacts corresponding to the digit and on first operation closes the contacts 507. Shortly after the last impulse of the digit is received the relay 555 restores and at armature 558 connects ground thru contacts 507 and the winding of the relay 540 to battery. The relay 540 operates and at armature 543 closes a circuit to the relay 510 from battery thru the winding of the relay 510 and armatures 543, 561 and 521 to ground. The relay 510 operates, connects itself to ground on conductor C503 thru armature 512, disconnects the relay 515 from the conductors C501 and C502 at armatures 511 and 514, and opens the circuit to the relay 520 at armature 513. The relays 515 and 520 restore and the connector is now held under control of the trunk circuit, Fig. 4, relays 510 and 560 being held operated from ground on conductor C503 and the relay 530 being held operated from ground on conductor C504. The relay 540 is operated over a previously traced circuit preparing a circuit for the ringing code from wiper 504 at armature 542. The relay 535 is operated or normal depending on the position of the wiper 503. The function of the relay 535 is to select the conductor to which the ringing code will be connected and in this case it is assumed that the wiper 503 stopped on one of the first five bank contacts and that the relay 503 is normal, thus a circuit is prepared for the ringing code thru armatures 542 and 536 to the upper conductor of the local line.

When the relay 515 is disconnected from the conductors C501 and C502, the circuit to the lower winding of the relay 450 is opened. The relay 450 is slow to operate but shortly after the circuit to its lower winding is opened the armature 452 is operated by the upper winding which is energized in series with the resistor 438 as previously described. The armature 452 short circuits the resistor 438 and the relay 450 operates in full connecting ground thru the upper winding of the relay 480 thru armature A450, right winding of repeating coil 434, armatures 456 and 491, and conductor C401 to conductor C501, connecting battery thru the lower winding of the relay 480, winding of the relay 470, armature 451, right winding of repeating coil 434, armature 424, 458 and 492 and conductor C402 to conductor C502, and at armature 454 energizing the upper winding of the relay 440 and the winding of the relay 485. The relay 440 operates and at armature 441 connects the winding of the relay 400 to contact 422, at armature 445 connects the ground to the Mot. St. lead to start the ringing code equipment, and at armature 446 opens a circuit for ground from armature 416 over conductor C404 to conductor C504.

The substation is signalled in one of the two following manners. If the key 279 is normal the relay 435 is operated as previously described and when the relay 440 operates ground is disconnected from the conductor C504 at armatures 436 and 446 and the holding circuit to the relay 530 is open. The relay 530 restores and as its starting circuit is open at armature 524 remains at normal. A signalling circuit may now be traced from ringing code thru wiper 504, armatures 542, 536, 531 and 567, wiper 526, contact 546, upper conductor of the line, ringer and condenser at substation 595, lower conductor of the line, contact 548, wiper 528, armatures 566, 534 and 503 and the lower winding of the relay 530 to battery. The relay 440 on operating opened the circuit to the relay 435 at armature 443. The relay 435 is slow to release but shortly after the relay 530 releases the relay 435 releases and, at armature 436, completes a circuit for ground to conductor C504. If the key 279 is operated during dialing the relay 435 is not operated and the relay 530 is held by ground thru armature 436 after the relay 440 operates. In this case the operator starts signalling by operating the key 140 closing a circuit from battery thru resistor 223, conductor C104, spring 145, center conductors of plug 172 and jack 417, armature 423, left winding of repeating coil 434, winding of the relay 455, left winding of repeating coil 434, armature 421, upper conductors of jack 417 and plug 172, and spring 142 to ground. The relay 455 operates and its function at this time is to disconnect ground from the conductor C504 at armature 459, thus releasing the relay 530. The key 140 is restored allowing the relay 455 to restore and connect ground to the conductor C504. The relay 530 on restoring completes a signalling circuit as previously described.

The ringing code leads are connected thru an interrupter alternately to direct ground and grounded alternating current potential in the well known manner. Removal of the receiver at the substation 595 closes a metallic bridge across the line conductors, thus providing a direct current circuit for the lower winding of the relay 530. The relay 530 operates armature 533 connecting its upper winding to ground on conductor C504. The relay 530 is operated in full by its upper winding, disconnecting the signalling circuit and closing the talking circuit at armatures 531 and 534. The windings of the relay 480 as previously described are connected to conductors C501 and C502, and are thus extended to the line and energized in series with the substation 595, supplying transmission battery thereto. The relay 480 operates, disconnects ground at armature 483 from the upper winding of the relay 420 and the lower conductor of the jack 417 for supervisory purposes, energizes the relay 460 from ground at armature 483, and energizes the relay 475 from ground at armature 482. The relay 475 operates, closes a holding circuit to itself at armature 477 and short circuits the winding of the relay 470 at armature 476. The relay 460 operates, prepares a circuit for Pos. Pot. at armature 461, prepares a holding circuit for the relay 480 at armature 462, prepares a circuit for the right conductor of the Ring. Ckt. at armature 463 and connects ground over conductor C404 to conductor C504 at armature 465.

The relays 400 and 490 may be operated under control of the operator under control of the keys 330 or 335 to extend Pos. Pot. or Neg. Pot. to a connected line circuit for operating a coin control mechanism which may be associated with a substation. When the jack 417 is opened the relay 410 restores and Pos. Pot. is extended thru armature 461 to the relay 400 to operate the relay 400 and the relay 405 to automatically extend Pos. Pot. to a connected line circuit. The foregoing operations are fully described and claimed in the co-pending application of Harry Newstedt.

When the plug 172 is removed from the jack 417, the relays 410 and 420 release. The relay 410 and at armature 415 opens the circuit to the relay 405 which restores and opens circuits to the relays 440 and 485 at armature 407, and at armature 412 opens the circuit to the upper winding of the relay 450. The relay 450 restores and opens circuits to the relays 440 and 485 permitting these relays to restore. The relay 405 on restoring disconnects ground from the conductor C503 at armature 408 and the relay 440 removes ground from the conductor C504 at armature 446 thus permitting the selector 500 and the connector in Fig. 5 to release. The relay 560 on releasing removes ground from the wiper 527 to allow the line circuit in Fig. 5 to restore to normal.

Having described the invention, what is considered to be new and is desired to be protected by Letters Patent will be set forth in the following claims.

What is claimed is:

1. In a telephone system, lines, an operator position, automatic switches for extending connections from said position to said lines, means for starting signalling of connected lines, and common apparatus at said position operable prior to extending connections from said position for controlling the starting of signalling of connected lines, said means effective for starting signalling responsive to connection to a line in case said common apparatus is operated in one manner and operated under control of said position after connection to a line in case said common apparatus is operated in another manner.

2. In a telephone system, subscriber lines, a plurality of connecting links, means including a dial for extending connections from said links to said lines, automatic ringing means for said lines, a ringing key in each link, said automatic ringing means being operable in case a connection is extended from a link to one of said lines responsive to the operation of the corresponding ringing key, a two position common key for said links, apparatus operable dependent on the position of said common key and under control of said dial, said automatic ringing means being operable under control of said apparatus in case a connection is extended from any one of said links to one of said lines.

3. In a telephone system, subscriber lines, an operator position, means including a calling device and a plurality of links for extending connections from said position to said lines, means controlled by said calling device for automatically signalling lines to which connections are extended by any of said links, a key at said position common to said links operable for disabling said last means, and a key in each link for starting automatic ringing on connections extended to said lines by individual ones of said links.

4. In a telephone system in which an impulsing device is utilized for extending connections to the lines of the system and wherein provision is made for automatic signalling of lines to which connections are extended, a connecting link, a control conductor, means for conditioning said connecting link for impulsing and for automatic signalling, said means being operated over said control conductor responsive to activating the impulsing device.

5. In a telephone system, lines, switching mechanism operable for extending connections to said lines and for signalling said lines, a switchboard having an impulse sender for operating said switching mechanism, a control conductor extending from said switchboard to said switching mechanism, and means for conditioning said impulse sender to control over said control conductor the extending of connections and the signalling.

6. In a telephone system, lines, means including an impulsing device for extending connections to said lines, signalling means for signalling lines to which connections are extended, a control conductor, two relays operated over said control conductor responsive to movement of said impulsing device from normal position, one of said relays being effective for controlling said signalling means and the other of said relays being effective for controlling a connection for said impulsing device.

7. In a telephone system, lines, switching equipment for extending connections to said lines, signalling apparatus in said switching equipment, an impulse sender having a normal position and effective for operating said switching equipment, means for moving said impulse sender from normal position, a first relay operated responsive to movement of said impulse sender from normal position for controlling said signalling apparatus, and a second relay operated responsive to the extension of a connection to one of said lines for operating said signalling apparatus and for releasing said first relay.

8. In a telephone system, automatic switching mechanism operable in response to a plurality of operations of a calling device for extending connections to a called subscriber line, a calling device for controlling the operation of said switching mechanism, automatic ringing equipment for signalling a called line, a first relay operated in the course of extending a connection to a called line, a second relay operated in response to one operation of said calling device for controlling said first relay, a third relay and means for operating it after the last of said plurality of calling device operations, means for releasing said first relay and said second relay responsive to the operation of said third relay, said first relay effective upon release for controlling said automatic ringing equipment to signal a called line, said second relay effective for controlling said first relay in case said first relay is re-operated, and means for re-operating said first relay.

9. In a telephone system, lines, a plurality of connecting links, an impulse sender, means including said impulse sender for connecting said links to said lines, automatic ringing means for said lines, a ringing key in each link, said automatic ringing means being operable in case a link is connected to one of said lines responsive to the operation of the corresponding ringing key, a switch common to said links, and apparatus operable under joint control of said switch and said impulse sender for operating said automatic ringing means in case any one of said links is connected to one of said lines.

HARVEY W. BALZER.

REFERENCES CITED

The following references are of record in the file of this patent:

UNITED STATES PATENTS

| Number | Name | Date |
|---|---|---|
| 1,200,829 | Goodrum | Oct. 10, 1916 |
| 1,298,589 | Slough | Mar. 25, 1919 |
| 1,560,858 | Richardson | Nov. 10, 1925 |
| 1,967,848 | Wicks | July 24, 1934 |
| 2,020,458 | Dahl | Nov. 12, 1935 |
| 2,120,419 | Stokely | June 14, 1938 |
| 2,311,214 | Crocker | Feb. 16, 1943 |
| 2,320,885 | Powell | June 1, 1943 |